United States Patent [19]

Hales

[11] 4,280,739

[45] Jul. 28, 1981

[54] PRESSURE MODULATING VALVES

[75] Inventor: Eric C. Hales, Dorridge, England

[73] Assignee: Automotive Products Limited, Warwickshire, England

[21] Appl. No.: 117,351

[22] Filed: Jan. 31, 1980

[30] Foreign Application Priority Data

Feb. 2, 1979 [GB] United Kingdom ............... 03801/79

[51] Int. Cl.³ .............................................. B60T 8/26
[52] U.S. Cl. .................................................. 303/6 C
[58] Field of Search ............... 188/349; 303/6 R, 6 C, 303/22 R, 61

[56] References Cited

U.S. PATENT DOCUMENTS

| | | | |
|---|---|---|---|
| 3,680,922 | 8/1972 | Kawai | 303/6 C |
| 3,738,708 | 6/1973 | Kawaguchi et al. | 303/6 C |

*Primary Examiner*—Duane A. Reger
*Attorney, Agent, or Firm*—Kemon & Estabrook

[57] ABSTRACT

The invention relates to vehicle braking system pressure modulating valves of the kind in which, above a first threshold of master cylinder pressure, the brake pressure increases with increasing master cylinder pressure but at a reduced rate, this rate being increased when a second threshold of master cylinder pressure is reached.

In the valve according to the invention a primary plunger and a secondary plunger are carried in separate bores in the valve housing, there being a lost motion connection between them. Primary spring determines the first threshold pressure and secondary spring determines the second threshold pressure.

1 Claim, 3 Drawing Figures

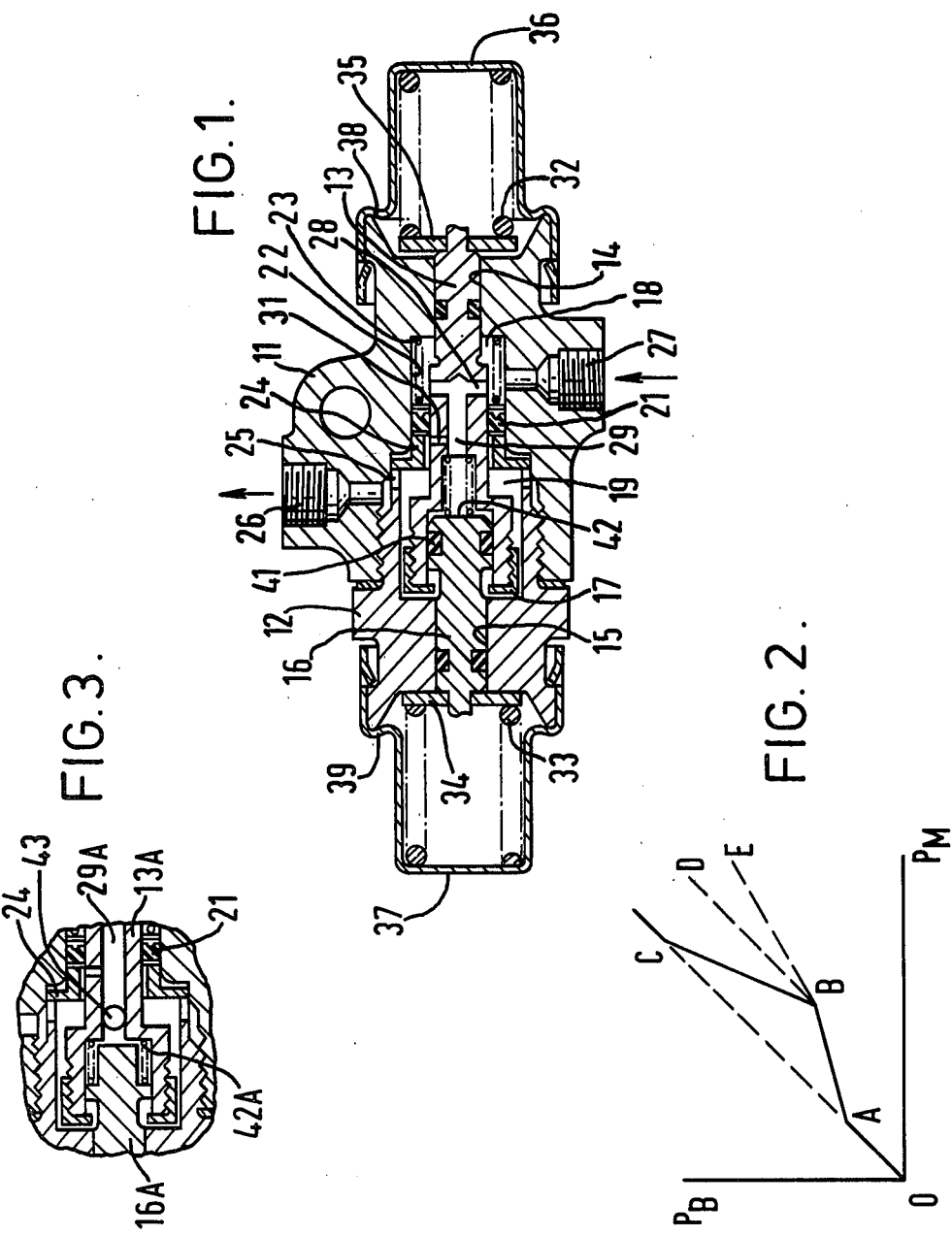

PRESSURE MODULATING VALVES

The invention relates to two stage pressure modulating valves for vehicle braking systems and which are of a kind in which above a first threshhold of master cylinder pressure brake increases with increasing master cylinder pressure at a reduced rate and above a second threshhold this rate increases.

Two stage valves of this kind are known from British Patent Specifications Nos. 1,327,182 and 1,337,911 but have not hitherto been produced in any significant number. This can be attributed to the unattractiveness of the designs from a production engineers viewpoint. The sleeve type of plunger used in the construction of these proposed valves needs careful machining to close tolerances and care is needed in its design to ensure adequate wall thickness to withstand the machining and subsequent handling. This leads to large effective piston areas and to high spring loads as a consequence. Also, in the known designs, it is difficult to provide easy adjustment of the spring loads which govern the threshhold pressures.

It is an object of the invention to provide a new and improved two stage modulating valve in which the abovementioned disadvantages can be obviated.

The invention provides a two stage pressure modulating valve for a vehicle braking system in which the modulating valve comprises a housing in which a stepped primary plunger is subject to brake pressure at an outlet port so as to be movable against both the bias of a primary spring and master cylinder pressure at an inlet port to meter flow from the inlet port to the outlet port such that brake pressure increases with increasing master cylinder pressure but at a reduced rate and in which a secondary plunger is subject to one or both of said pressures so as to be movable against the bias of a preloaded secondary spring into engagement with the primary plunger so as to be movable therewith and increase the rate at which brake pressure increases with master cylinder pressure, the primary and secondary pistons each being slidable in separate bores in the housing which are situated adjacent opposite ends of the housing and being biased towards each other by the primary and secondary springs respectively.

In one preferred embodiment of the invention the plungers have a sealed spigoted interconnection which is subject to master cylinder pressure at the inlet port to bias the plungers away from each other.

The term "master cylinder" is used in the context of this specification to denote any source of hydraulic pressure which is controlled by the driver of the vehicle to which the modulating valve is fitted.

The invention will now be described by way of example and with reference to the accompanying drawings, of which:

FIG. 1 is a cross-section of a modulating valve according to the invention;

FIG. 2 is a graph showing diagrammatically the characteristics of modulating valves according to the invention; and FIG. 3 is a scrap section showing a modification to the valve shown in FIG. 1.

Referring to FIG. 1, the modulating valve shown has a housing comprising a main body portion 11 and an end portion 12 screw threaded into the main portion 11.

A stepped primary plunger 13 has its small diameter portion slidable in a first bore 14 in the housing, situated adjacent the end of the main body portion 11. Adjacent the other end of the housing, in the end body portion 12, a second bore 15, coaxial with bore 14, receives the small diameter portion of a stepped secondary plunger 16 which has a lost-motion connection with the primary plunger 13 provided for by a stepped internal bore in the primary plunger 13 into which is spigotted the large diameter portion of the secondary plunger 16 and by a sleeve nut 17 which is screwed onto the large diameter end portion of the primary plunger 13.

The assembly of housing parts 11 and 12 with plungers 13 and 16 provides an annular cavity within the housing between the bores 14 and 15 which is divided into a first chamber 18 and a second chamber 19 by sealing means in the form of an annular cup seal 21 which encircles and is slidable over an intermediate diameter portion of the primary plunger 13 and which is also slidable in a bore portion 22 in the main body portion 11 adjacent bore 14. Seal 21 is flanked by two metal support washers and is biassed by a light compression spring 23 in chamber 18 into a normal position in the bore set by the abutment of one of the washers with a L-section washer 24. This L-section washer 24 is positioned in chamber 19 by abutment with the adjacent end face of the end body portion 12, this end having slots 25 to allow the second chamber 19 to communicate with an outlet port 26.

An inlet port 27 opens directly into the first chamber 18, communication between the first chamber 18 and the second chamber being provided (as shown in FIG. 1) by passage means comprising a diametral passage 28, an axial drilling 29 and a radial port 31, all in the primary plunger 13.

The primary plunger 13 and the secondary plunger 16 are biassed towards each other by a primary spring 32 and a secondary spring 33 respectively. Movement of the primary plunger 13 under the load of spring 32 is limited by abutment of cap nut 17 with the housing body end portion 12, there being driving slots in the abutting end face of the cap nut which also allows circulation of brake fluid. Movement of the secondary plunger 16 under the load of spring 33 is limited by the abutment with housing portion 12 of a washer 34 which also transmits hydraulic loads from the secondary plunger 16 onto the secondary spring 33. A similar washer 35 acts between the primary spring 32 and plunger 13 but does not come into abutment with the main body portion 11.

The primary and secondary springs 32 and 33 are each retained by a respective pressed cup 36 and 37. These are retained by staking and are adjustable for length by controlled collapsing of the frusto-conical sections 38 and 39 as described in British Patent Specification No. 1,488,353.

The spigotted connection between the plungers 13 and 16 is sealed by a seal ring 41. Similar rings are used on the plungers for sealing bores 14 and 15. Axial drilling 29 extends from the stepped internal bore in the primary plunger 13 so that master cylinder pressure from port 27 will tend to move the plungers 13 and 16 apart. A light compression spring 42 is provided housed in the small diameter bore portion in plunger 13 to ensure that the secondary plunger 16 remains in contact with washer 34.

In the initial stages of operation of the valve there is a free passage for fluid between the inlet port 27 and the outlet port 26 since the various parts are in the positions shown in FIG. 1. As master cylinder pressure increases it produces a load on the primary plunger 13 which is equivalent to this pressure acting on the cross-sectional area of bore 14. This load acts against the load of the primary spring 32 whose preload is chosen such that the primary plunger 13 moves against its associated spring 32 away from the secondary plunger 16 before the hydraulic loads on the secondary plunger 16 are sufficient to overcome the preload of the secondary spring 33. This movement of the primary plunger 13 causes port 31 to become blocked by seal 21 so that for a while pressure in the first chamber 18 continues to increase while pressure in the second chamber 19 remains the same. However, the increasing pressure in the first chamber 18 acts on an effective piston area of the primary plunger 13 equivalent to the annular area difference between the cross-sectional area of bore 14 and the area within the internal diameter of seal 21 and this produces a force which forces plunger 13 back towards the secondary plunger 16 to allow port 31 to become re-opened. This action is described in our British Patent Specification No. 1,557,051 but it is also dependent on the effective piston area of the sealed spigotted connection between the plungers 13 and 16, i.e. the area within the outer diameter of seal 41, since this is also subject to the increasing master cylinder pressure which is tending to keep the primary plunger 13 biassed away from the secondary plunger 16. It should be noted that the valve shown in FIG. 1 is thus somewhat diagrammatic in that the outer diameter of seal 41 needs to be very much smaller than the inner diameter of seal 21, as may be shown by a simple analysis of the valve.

Operation of the valve as described above is shown diagrammatically in FIG. 2 as a graph of brake pressure $P_B$ against master cylinder pressure $P_M$. The initial stage of operation is given by the 1:1 ratio line from the origin 0 to point A. The first stage of pressure reduction, described above gives the line A-B. The slope of this line is less than unity and may be zero if the various areas of the plungers 13 and 16 are so chosen.

At point B of FIG. 2 there is a change of slope caused by the action of the secondary plunger moving under the action of master cylinder pressure on the spigotted connection between the plungers 13 and 16 against the preload of the secondary spring 33. When the secondary plunger contacts the sleeve nut 17 the two plungers 13 and 16 effectively become one so that the pressure modulation continues but at an increased ratio whose magnitude is dependent on the cross-sectional area of bore 15 as well as that of bore 14 and the area within the internal diameter of seal 21. This increased ratio is shown typically in FIG. 2 as line B-C in which the increments of brake pressure are greater than master cylinder pressure until the brake pressure reaches the same magnitude as master cylinder pressure at point C. At this stage the primary plunger 13 remains in the position shown in FIG. 1 but with the secondary plunger 16 biassed away from it and in contact with the sleeve nut 17.

If desired, the plunger areas can be arranged to produce a slope of one for the second stage of operation, as shown by line B-D in FIG. 2 or one which is less than unity, as shown by line B-E.

In the modification shown in FIG. 3, the axial drilling 29A in the primary plunger 13A is sealed by a pressed in ball 43. Seal 41 is deleted and a larger diameter spring 42A acts on a modified secondary plunger 16A. Operation of this modified valve is similar to that described above with reference to FIG. 1 except that in the first phase of operation the only effective areas which require consideration are the cross-sectional area of bore 14 and that within the inner diameter of seal 21.

I claim:

1. A two stage pressure modulating valve for a vehicle braking system, the modulating valve comprising:
   a housing;
   a first bore in the housing and having an opening adjacent to one end thereof;
   a second bore in the housing and having an opening adjacent to the other end thereof, the axis of said second bore being aligned with the axis of said first bore;
   a stepped primary plunger having a small diameter plunger portion sealingly slidable in the first bore;
   a secondary plunger sealingly slidable in the second bore and having a lost motion connection with the primary plunger which allows limited axial movement therebetween;
   a cavity in the housing between the first bore and the second bore;
   sealing means in said cavity slidably engaging a large diameter plunger portion of the primary plunger and dividing the cavity into a first chamber defined between said sealing means and the first bore and a second chamber defined between said sealing means and the second bore;
   a primary spring biasing the primary plunger towards the secondary plunger;
   a pre-loaded secondary spring biasing the secondary plunger towards the primary plunger;
   an inlet port in the housing and communicating with the first chamber;
   an outlet port in the housing and communicating with the second chamber;
   and valve means for by-passing said sealing means to allow flow from the second chamber to the first chamber when pressure at the outlet port exceeds pressure at the inlet port by a substantial amount and to prevent flow from the first chamber to the second chamber when the force produced by pressure in the first and second chambers acting on the primary plunger overcomes the loading of the primary spring.

* * * * *